(12) United States Patent
Chiappetta

(10) Patent No.: US 6,813,448 B1
(45) Date of Patent: Nov. 2, 2004

(54) SUPPRESSION OF STIMULATED BRILLOUIN SCATTERING IN OPTICAL TRANSMISSIONS

(75) Inventor: Joseph F. Chiappetta, Shelton, CT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 482 days.

(21) Appl. No.: 09/627,831

(22) Filed: Jul. 28, 2000

(51) Int. Cl.[7] .............................................. H04B 10/00
(52) U.S. Cl. ...................... 398/158; 398/182; 398/183; 398/185; 398/186; 398/187; 398/188; 398/192; 398/193; 398/194; 398/147; 398/159; 398/200
(58) Field of Search ................................ 398/182, 183, 398/185, 186, 147, 193, 187, 188, 159, 194, 192, 158, 200

(56) References Cited

U.S. PATENT DOCUMENTS

| | | | |
|---|---|---|---|
| 4,560,246 A | | 12/1985 | Cotter |
| 5,282,072 A | | 1/1994 | Nazarathy et al. |
| 5,566,381 A | | 10/1996 | Korotky |
| 5,737,109 A | | 4/1998 | Goodwin |
| 4,560,246 A | | 6/1998 | Cotter |
| 5,828,477 A | | 10/1998 | Nilsson et al. |
| 5,892,607 A | | 4/1999 | Atlas |
| 5,930,024 A | | 7/1999 | Atlas |
| 5,953,139 A | | 9/1999 | Nemecek et al. |
| 5,991,061 A | | 11/1999 | Adams et al. |
| 6,252,693 B1 | * | 6/2001 | Blauvelt .................... 359/183 |
| 6,282,003 B1 | * | 8/2001 | Logan, Jr. et al. .......... 359/161 |
| 6,535,315 B1 | * | 3/2003 | Way et al. ................. 359/180 |

FOREIGN PATENT DOCUMENTS

| | | |
|---|---|---|
| WO | WO 97/26723 | 7/1997 |
| WO | WO 99/04298 | 1/1999 |
| WO | WO 99/08406 | 2/1999 |
| WO | WO 01/50643 A1 | 7/2001 |

OTHER PUBLICATIONS

Yao, Steve, et al. "Optoelectronic Oscillator for Photonic Systems", IEEE Journal of Quantum Electronics, vol. 32, No. 7, Jul. 1996, pp. 1141–1149.

Zhang, Jian–Guo, et al. "Design of Efficient Optical Fiber Communication Systems for CATV/HDTV Distribution", IEEE Transactions on Consumer Electronics, vol. 43, No. 3, Aug. 1, 1997, pp. 453–461.

* cited by examiner

*Primary Examiner*—Hanh Phan
(74) *Attorney, Agent, or Firm*—Fogg and Associates, LLC; Laura A. Ryan

(57) ABSTRACT

A transmitter that performs stimulated Brillouin scattering suppression is provided. The transmitter includes a non-linear device having an optical input adapted to receive an optical signal, an amplitude modulation input adapted to receive an amplitude modulation signal, a phase modulation input and an output. The transmitter also includes a stimulated Brillouin scattering (SBS) oscillator/driver having first and second oscillators coupled to the phase modulation input of the non-linear device and an amplifier coupled to the output of the non-linear device. The transmitter further includes a laser coupled to the optical input of the non-linear device.

80 Claims, 8 Drawing Sheets

SUPPRESSION OF STIMULATED BRILLOUIN SCATTERING IN OPTICAL TRANSMISSIONS

TECHNICAL FIELD

The present invention relates generally to the field of telecommunications and, in particular, to the suppression of stimulated Brillouin scattering in optical transmissions.

BACKGROUND

Telecommunications systems transmit signals between user equipment, e.g., telephones, radios, and computers, over a network. Conventional telecommunications systems include, but are not limited to the public switched telephone network (PSTN), the Internet, wireless networks, and cable television networks. These networks typically include transmission media such as coaxial cable, copper wires, optical fibers, and wireless links, e.g., radio and satellite communications.

In optical transmission systems, one of the optical transmitter types that feed relatively high-powered optical signals into long fiber lengths is a configuration designed around a Mach-Zehnder modulator. The modulator is generally fed from a relatively high power laser. The laser operates in the cool white mode and provides the "light source" that has its intensity or amplitude modulated in the Mach-Zehnder device. The optical modulation is accomplished by feeding the radio frequency (RF) modulating signal to the appropriate amplitude modulation (AM) port of the modulator. In this way RF amplitude modulation is converted into optical amplitude modulation.

A detrimental characteristic of feeding high optical powered signals into long lengths of fiber is that noise and distortion are generated when the stimulated Brillouin scattering (SBS) launch power threshold of the fiber is exceeded. Stimulated Brillouin scattering (SBS).is a nonlinear optical effect that poses a significant restriction to the amount of narrow-line width optical power that can be launched into a long length of single-mode optical fiber. For a given length of single-mode fiber with a given attenuation coefficient at the chosen optical wavelength, there is an optical-linewidth-dependent threshold power below which SBS does not occur. In order to launch high optical signal powers, for example, in the 1550 nm wavelength region for transmission of broadband signals over long fiber distances, SBS needs to be suppressed. SBS creates excessive noise in the received signal and causes distortion.

FIG. 5a illustrates that when the power of a wavelength of interest, $\lambda 1$, exceeds the SBS launch power threshold (Psbs) another, undesired wavelength, $\lambda n$, is generated. The undesired wavelength $\lambda n$ has a very noisy and somewhat distorted signal content. Both of these wavelengths propagate down the fiber. At the end of the fiber this degraded and unwanted wavelength impinges on the optical receiver along with the wavelength of interest. The noise from the undesired wavelength will be demodulated along with the normal signal from the wavelength of interest. The distortion and primarily the noise from the undesired wavelength severely degrade the desired signal.

These detrimental effects are experienced if the power of any one of many individual optical wavelength signals launched into a long fiber exceeds the SBS threshold. It is not the total aggregate optical power that is critical in determining the SBS launch power threshold and its associated signal degradation. The SBS effects are also related to the length of the fiber. The longer the fiber, the lower the SBS threshold and the more severe the problem.

The total net optical power of many wavelengths that impinge on a receiver determines the quality of the received signal. However, the SBS threshold is based on only the individual power of the strongest wavelength. One conventional approach to assuring compliance with the SBS threshold is to distribute the optical power of one wavelength over many wavelengths. This is conventionally accomplished by phase modulating an amplitude modulated optical signal emanating from the output of a typical optical modulator. This phase modulation can be achieved in an optical modulator, such as a Mach-Zehder optical modulator, with a built-in and separately fed phase modulation port. This can also be achieved by using a separate optical phase modulator in series with an AM.

Driving the phase modulation port with a sufficiently large signal produces optical sidebands that follow standard Bessel function characteristics as illustrated by the graph of FIG. 5b. Using the correct drive level lowers the power of the main wavelength, $\lambda 1$, below the critical SBS launch power threshold (Psbs) to a new power level P1. The new wavelength $\lambda 1'$ and the other wavelengths $\lambda 2'$ to $\lambda 5'$ that are produced are each lower in power than the original signal, $\lambda 1$, shown in FIG. 5a. The total power of all of the sidebands theoretically equals the power of the original wavelength $\lambda 1$ before the phase modulation was applied. All of the wavelengths will contain the desired RF AM modulation content, and all are normally "detected" by the photo-detector of the optical receiver to effectively produce the desired RF output signal from the optical receiver. The RF frequency at the phase port should be high enough to prevent harmonics and mixed RF components from contaminating the main RF signal content and typically can be a microwave frequency in the 1–3 Ghz range.

This technique for reducing the desired wavelength below the SBS threshold only provides a small margin of protection. With the increased need for power in transmissions, this technique provides limited improvements in transmission capabilities in optical systems. In optical transmission systems and especially in systems having long unrepeated fiber spans, it is important to launch as high an optical power into the transmission fiber as possible. Unfortunately, the amount of launch power usable at a particular wavelength is limited by SBS. The SBS degrades the optical signals and increases bit error rates for the data transported by the transmission system.

For the reasons stated above, and for other reasons stated below which will become apparent to those skilled in the art upon reading and understanding the present specification, there is a need in the art for improvements in compensating for the effects of SBS in telecommunications systems.

SUMMARY

The above mentioned problems with optical transmission in long fiber lengths and other problems are addressed by embodiments of the present invention and will be understood by reading and studying the following specification.

In one embodiment, a transmitter is provided. The transmitter includes a non-linear device having an optical input adapted to receive an optical signal, an amplitude modulation input adapted to receive an amplitude modulation signal, a phase modulation input and an output. The transmitter also includes a stimulated Brillouin scattering (SBS) oscillator/driver having first and second oscillators coupled to the phase modulation input of the non-linear device and an amplifier coupled to the output of the non-linear device. The transmitter further includes a laser coupled to the optical input of the non-linear device.

In another embodiment, a transmitter is provided. The transmitter includes an optical modulator that includes an input adapted to receive a radio frequency signal, an optical signal input, and an output. The transmitter also includes a phase modulator having an optical input, a phase modulation input and an output. The output of the phase modulator is coupled to the optical input of the optical modulator. The transmitter further includes an SBS oscillator/driver coupled to the phase modulation input of the phase modulator, an amplifier coupled to the output of the optical modulator and a laser coupled to the optical input of the phase modulator.

In another embodiment, a communication system is provided. The communication system includes a transmitter having a non-linear device with an optical input, an amplitude modulation input, a phase modulation input and an output. The transmitter also includes a stimulated Brillouin scattering (SBS) oscillator/driver having first and second oscillators coupled to the phase modulation input of the non-linear device. The communication system also includes at least one receiver and at least one transmission line coupled between the transmitter and the at least one receiver.

In a further embodiment, a method of suppressing stimulated Brillouin scattering in an optical transmission is provided. The method includes receiving a radio frequency input signal, amplitude modulating the radio frequency signal and feeding the amplitude modulated radio frequency signal to an amplitude modulation input of a non-linear device. The method also includes generating an optical signal using a laser and feeding the optical signal to an optical input of the non-linear device. The method further includes frequency modulating the optical signal using a microwave radio frequency signal generated by a first oscillator, frequency modulating the microwave radio frequency signal using a second oscillator which is coupled to an input of the first oscillator and feeding the frequency modulated microwave radio frequency signal to a phase modulation port of the non-linear device.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and; electrical changes may be made without departing from the spirit and scope of the present invention. The following detailed description is, therefore, not to be taken in a limiting sense.

Figure 1:
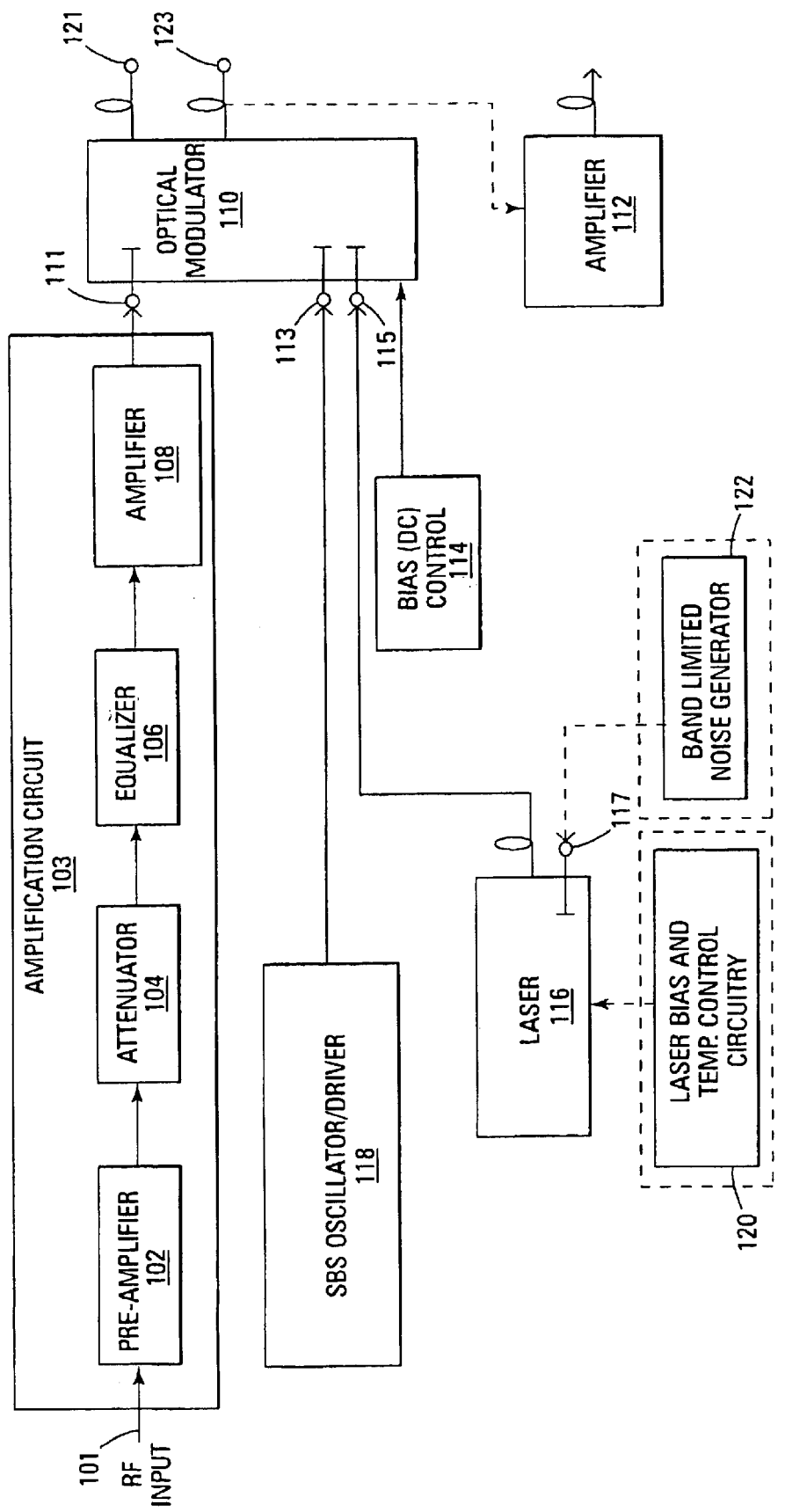
FIG. 1 is a block diagram of an embodiment of a transmitter with stimulated Brillouin scattering suppression according to the teachings of this invention.

FIG. 1 is a block diagram of one embodiment of a transmitter including an SBS oscillator driver 118, indicated generally at 100, and constructed according to the teachings of the present invention. Transmitter 100 receives a radio frequency (RF) input signal at input 101, an optical input signal at input 115, and produces two modulated optical outputs 121 and 123. In other embodiments, the transmitter may produce one or more optical outputs. The RF input signal is fed into an amplification circuit 103 that receives the signal, amplifies the signal to produce an amplitude modulation (AM) signal and feeds the AM signal to optical modulator 110 or other non-linear device capable of varying the signal. The AM signal is received by optical modulator 110 at input 111 and is used to amplitude modulate the optical input signal for transmission. In this embodiment, modulator 110 is an optical modulator external to the transmitter. In another embodiment, modulator 110 is a Mach-Zehnder optical modulator and may be internal or external to the transmitter. In alternate embodiments, the modulator may comprise any variety of internal or external non-linear devices such as an optical modulator, a directly modulated laser or the like.

In one embodiment, the amplification circuit 103 comprises the series combination of a pre-amplifier 102, an attenuator 104, an equalizer 106 and an amplifier 108. The amplification circuit 103 prepares the RF input signal for modulation by modulator 110. The pre-amplifier 102 boosts the input signal to the correct level to improve the transmitter input signal-to-noise ratio. The following attenuator 104, equalizer 106, and amplifier 108, shape the RF input signal to properly drive the modulator 110 under varying input signal conditions.

In operation, the pre-amplifier 102 receives the input signal at input 101, amplifies it and feeds it to attenuator 104. Attenuator 104 receives the amplified signal, attenuates the signal and then feeds the attenuated signal to equalizer 166. In alternate embodiments, the attenuator 104 may comprise a PIN attenuator, a variable attenuator or the like. In addition, in alternate embodiments, attenuator 104 may be coupled to an attenuator control device or include an integral attenuator control device. Equalizer 106 receives the attenuated signal, equalizes it and feeds it to an amplifier 108.

Amplifier 108 receives the equalized signal, amplifies it and feeds it to optical modulator 110. In other embodiments, the amplification circuit 103 may comprise alternative circuit components that prepare the RF input signal for modulation by optical modulator 110.

Further, transmitter 100 includes a laser 116 coupled to optical modulator 110. In one embodiment, transmitter 100 also includes a DC bias control device 114 coupled to optical modulator 110. The laser 116 operates in the cool white (CW) mode and provides the "light source" that has its intensity or amplitude modulated in the optical modulator 110. The optical modulation is accomplished by feeding the radio frequency AM signal to the appropriate amplitude modulation port 111 of optical modulator 110. In this way, RF amplitude modulation is converted into optical amplitude modulation.

In one embodiment, transmitter 100 includes laser bias and temperature control circuitry 120 coupled to laser 116. In an alternate embodiment, laser bias and temperature control circuitry 120 are integral to laser 116.

Transmitter 100 further includes a stimulated Brillouin scattering (SBS) oscillator/driver 118 coupled to optical modulator 110. In one embodiment, SBS oscillator/driver 118 is coupled to a phase modulation port 113 of optical modulator 110. The SBS oscillator/driver 118 distributes the total optical power of the amplitude modulated optical signal of optical modulator 110 amongst many optical wavelengths by dual frequency modulation. SBS oscillator/driver 118 includes two oscillators in order to perform the dual frequency modulation. One way of achieving phase modulation of a signal is by frequency modulation as a result the terms phase and frequency modulation are being used interchangeably in this application.

Figure 5A:
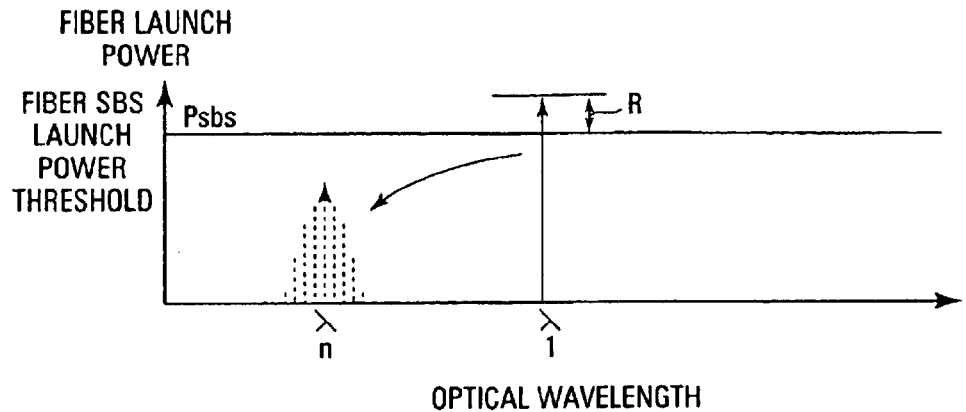
FIG. 5a is a graph that illustrates an example of an optical wavelength exceeding the fiber stimulated Brillouin scattering launch power threshold.
Figure 5B:
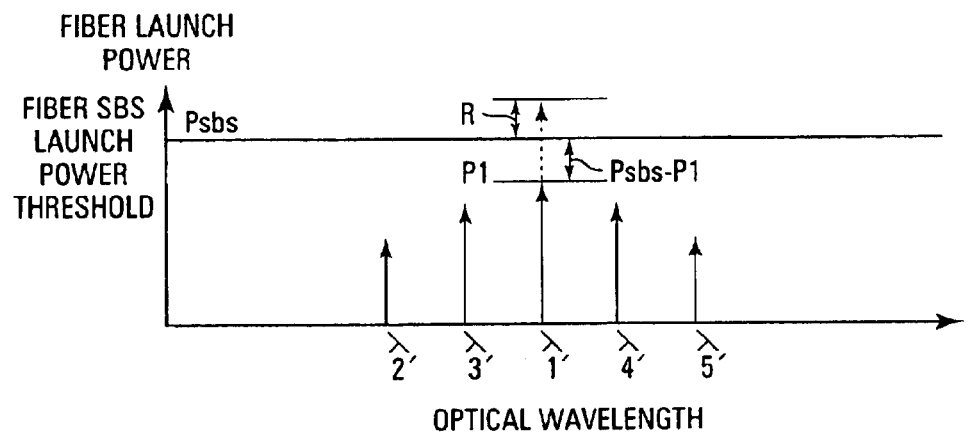
FIG. 5b is a graph that illustrates an example of optical side bands produced by frequency modulating an optical signal.

By way of example, FIG. 5a shows optical wavelength, $\lambda 1$, which exceeds the fiber SBS launch power threshold (Psbs) by an amount R. As a result the undesired wavelength, $\lambda n$, is generated. SBS oscillator/driver 118 reduces the power of $\lambda 1$ by distributing the wavelength over a plurality of wavelengths $\lambda 1'$ to $\lambda 5'$, as illustrated by FIG. 5b. A first oscillator of the two oscillators of the SBS oscillator/driver 118 accomplishes this. In one embodiment, the first oscillator is a microwave voltage controlled oscillator. It is understood that five wavelengths are shown by way of example and that the number of wavelengths $\lambda 1$ is distributed into may vary. The power of the original wavelength $\lambda 1$ has been lowered below the critical SBS launch power threshold (Psbs) to a new power level P1. The new wavelength $\lambda 1'$ and the other wavelengths $\lambda 2'$ to $\lambda 5'$ that are produced are each lower in power than the original signal $\lambda 1$ shown in FIG. 5a. The total power of $\lambda 1'$ to $\lambda 5'$ is equal to the power of the original wavelength $\lambda 1$ before the frequency modulation was applied. The frequency modulation and the resulting distribution of the total optical power are accomplished by using a microwave RF signal to drive phase modulation port 113. This keeps the power of the strongest optical wavelength $\lambda 1'$ below the SBS threshold level. In one embodiment, the microwave RF signal used to drive the phase modulation port has a microwave frequency in the 1–3 Ghz range.

Figure 5C:
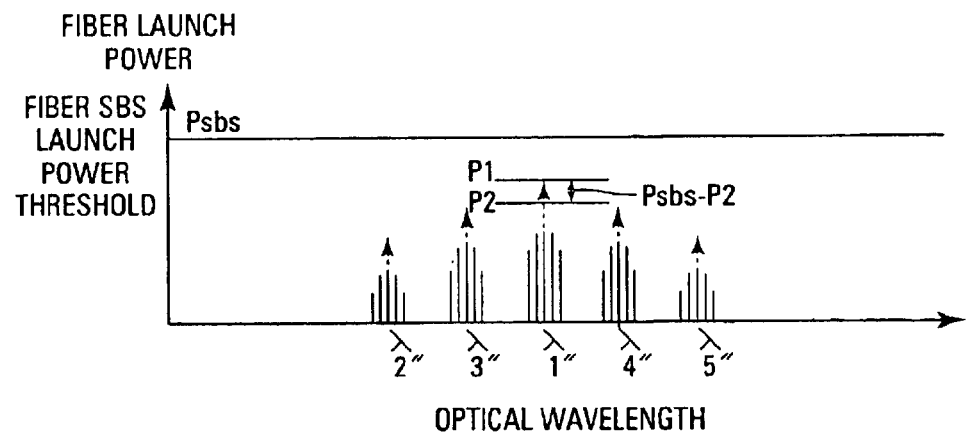
FIG. 5c is a graph that illustrates an example of stimulated Brillouin scattering suppression effects according to one embodiment of the present invention.

In order to increase the total launch power while suppressing the effects of SBS, SBS oscillator/driver 118 frequency modulates the microwave RF signal that drives the phase port 113 of optical modulator 110 using a second oscillator. In one embodiment, the second oscillator is coupled to an input of the first oscillator. Instead of only one high frequency RF signal driving the optical phase port to create optical sidebands, there are many RF signals. The result is a distribution of energy amongst the many optical sidebands that are produced by the FM modulation, of FIG. 5b, as illustrated by FIG. 5c. When driving the phase port, each of these RF components will generate their own distribution of other optical wavelengths (optical sidebands) on either side of the original wavelengths $\lambda 1"$ to $\lambda 5"$ (formerly $\lambda 1'$ to $\lambda 5'$) as shown in FIG. 5c. In operation, the SBS oscillator/driver 118 feeds the frequency modulated signal into a phase modulation port 113 of optical modulator 110, which results in frequency modulation of the optical signal, or dual frequency modulation, to allow for a high optical launch power by amplifier 112 without the effects of SBS. In one embodiment, amplifier 112 is an Erbium Doped Fiber amplifier (EDFA). Again, although only a limited number of optical side bands are shown in FIG. 5c, any number of optical sidebands may be produced.

Setting the FM drive level to the correct power level results in SBS oscillator/driver 118 further reducing the power of the original wavelength to a level P2 and a higher total launch power can be achieved without the detrimental effects of SBS. As a result of the dual frequency modulation, the strongest optical wavelength is now at a level P2 away from the critical SBS launch power threshold (Psbs). This improves the amount of gain that can be achieved at the output and the total system launch power.

Figure 6A:
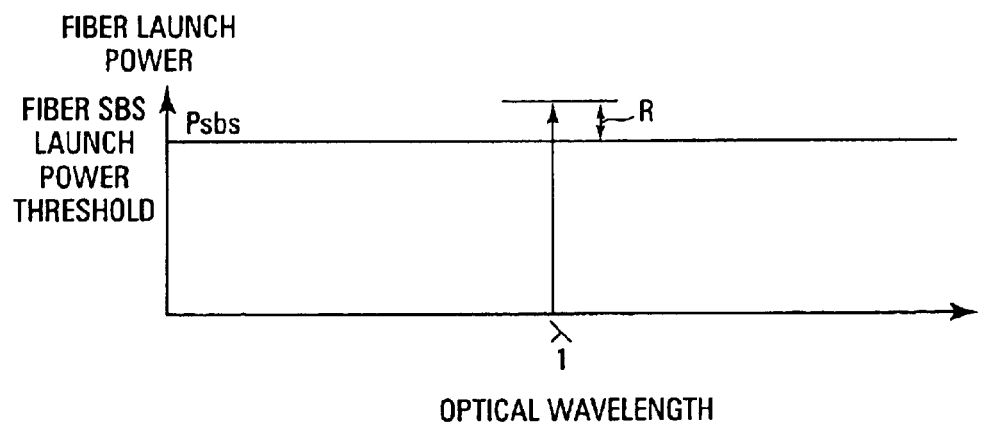
FIG. 6a is graph that illustrates another example of an optical wavelength exceeding the fiber stimulated Brillouin scattering launch power threshold.
Figure 6B:
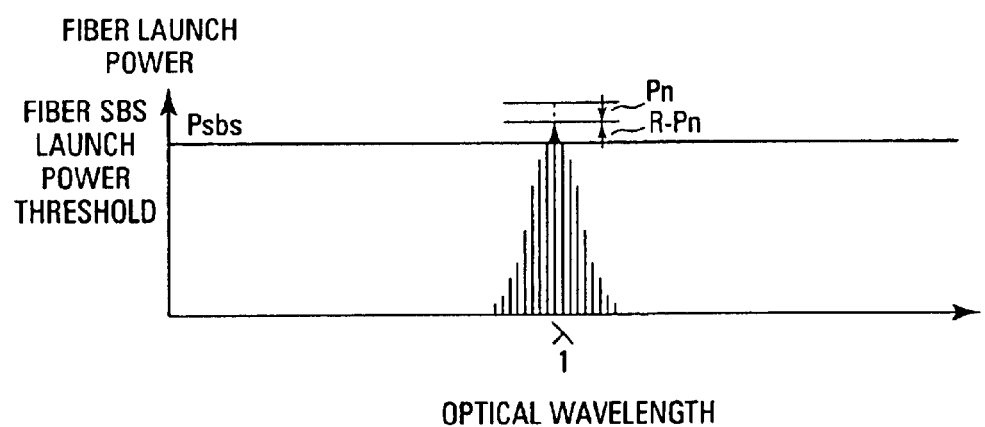
FIG. 6b is a graph that illustrates another example of stimulated Brillouin scattering suppression effects of another embodiment of the present invention.

In one embodiment, transmitter 100 includes a band limited noise generator 122 coupled to laser 116. In operation, band limited noise generator 122 is used to feed an amplitude modulation port 117 of the laser 116 in order to generate signals at a plurality of wavelengths based on the frequency modulation (chirp) factor of the laser. By taking a signal such as $\lambda 1$ of FIG. 6a and putting some modulation on that particular signal by driving the laser 116 with noise the result is a reduction in the overall launch power (Psbs) of $\lambda 1$ by an amount Pn. The power in the strongest wavelength $\lambda 1'$ still exceeds Psbs but by an amount less than without the addition of noise. The noise modulation of laser 116 produces many lower powered optical wavelengths, sidebands, as shown in FIG. 6b. The noise drops the main signal $\lambda 1$, reduces the amplitude, which provides additional margin with respect to Psbs. Combining the noise modulation with the frequency modulation of the optical signal and the frequency modulation of the high frequency microwave RF signal results in a plurality of optical signals at a level of P2+Pn or more away from Psbs. As a result, the drive capability of the system has now been increased over the dual frequency modulation system discussed above.

Figure 2:
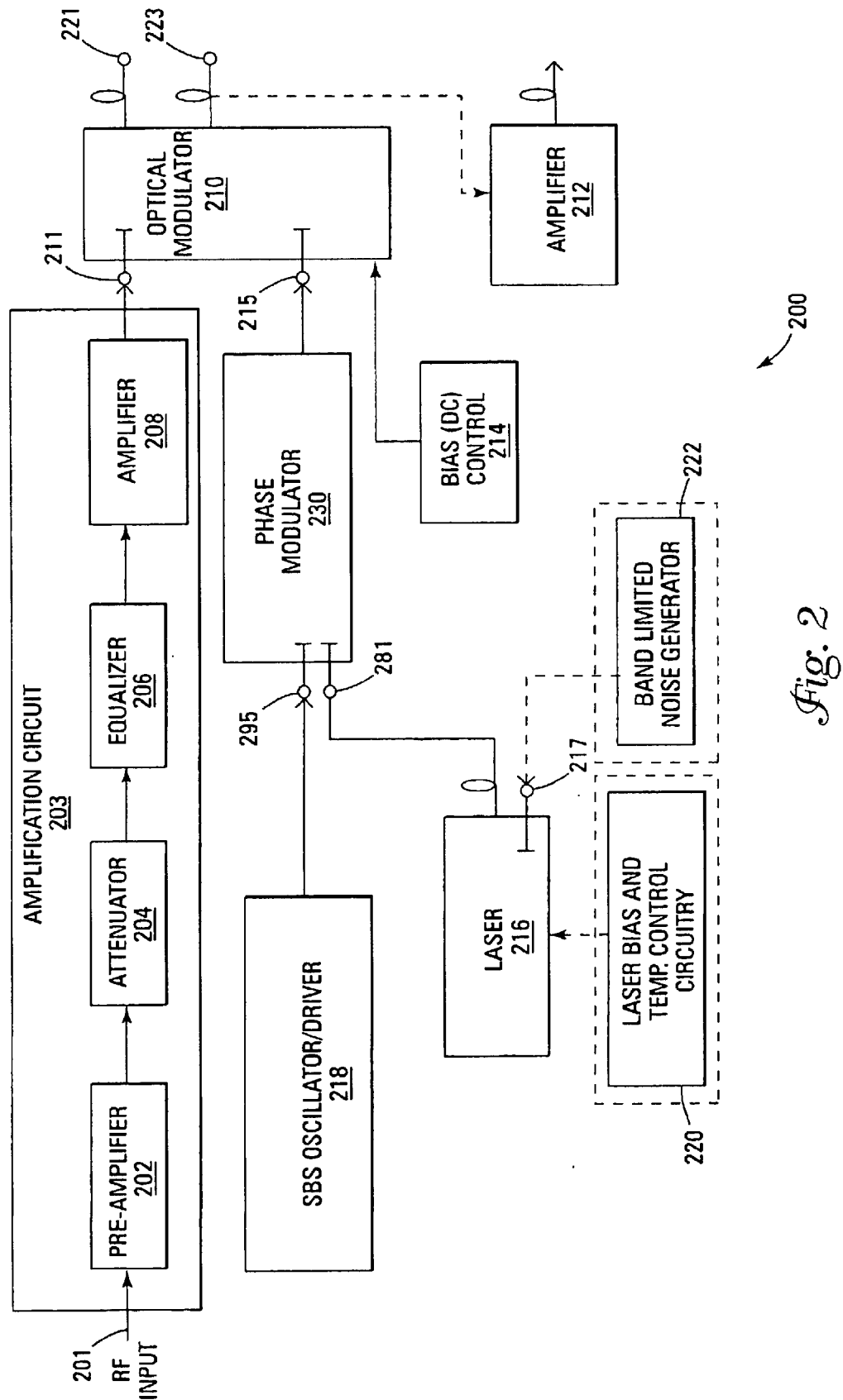
FIG. 2 is a block diagram of another embodiment of a transmitter with stimulated Brillouin scattering suppression according to the teachings of the present invention.

FIG. 2 is a block diagram of another embodiment of a transmitter including an SBS oscillator driver 218, indicated generally at 200, and constructed according to the teachings of the present invention. Transmitter 200 receives a radio frequency (RF) input signal at input 201 and produces two optical outputs 221 and 223. In other embodiments, the transmitter 200 may produce one or more optical outputs. The input signal is fed into an amplification circuit 203 that receives the signal, amplifies the signal and feeds the amplified signal to the optical modulator 210 for modulation. The amplified signal is received by optical modulator 210 and is modulated for transmission over optical fibers. In this embodiment, modulator 210 is an optical modulator external to the transmitter. In another embodiment, modulator 210 is a Mach-Zehnder optical modulator and may be internal or external to the transmitter. In alternate embodiments the modulator may comprise any variety of internal or external non-linear devices such as an optical modulator, a directly modulated laser or the like.

In one embodiment, the amplification circuit 203 comprises the series combination of a pre-amplifier 202, an attenuator 204, an equalizer 206 and an amplifier 208. The amplification circuit 203 prepares the RF input signal for modulation by modulator 210. In other embodiments, the amplification circuit 203 may comprise alternative circuit components. The pre-amplifier 202 receives the input signal at input 201 amplifies it and feeds it to attenuator 204. Attenuator 204 receives the amplified signal, attenuates the signal and then feeds the attenuated signal to equalizer 206. In alternate embodiments, the attenuator 204 may comprise a PIN attenuator, a variable attenuator or the like. In addition, in alternate embodiments, attenuator 204 may be coupled to an attenuator control device or include an integral attenuator control device. Equalizer 206 receives the attenuated signal equalizes it and feeds it to an amplifier 208. Amplifier 208 receives the equalized signal and amplifies it and feeds it to optical modulator 210.

Transmitter 200 further includes an SBS oscillator/driver 218 coupled to a phase modulator 230 that in turn is coupled to optical modulator 210. In one embodiment, SBS oscillator/driver 218 is coupled to a phase modulation port 295 of phase modulator 230. The SBS oscillator/driver 218 distributes the total optical power of the amplitude modulated optical signal of optical modulator 210 amongst many optical wavelengths by dual frequency modulation. SBS oscillator/driver 218 includes two oscillators in order to perform the dual frequency modulation.

By way of example, FIG. 5a shows optical wavelength, $\lambda 1$, which exceeds the fiber SBS launch power threshold (Psbs) by an amount R. As a result the undesired wavelength, $\lambda n$, is generated. SBS oscillator/driver 218 reduces the power of $\lambda 1$ by distributing the wavelength over a plurality of wavelengths $\lambda 1'$ to $\lambda 5'$, as illustrated by FIG. 5b. A first oscillator of the two oscillators of the SBS oscillator/driver 218 accomplishes this. In one embodiment, the first oscillator is a microwave voltage controlled oscillator. It is understood that five wavelengths are shown by way of example and that the number of wavelengths $\lambda 1$ is distributed into may vary. The power of the original wavelength $\lambda 1$ has been lowered below the critical SBS launch power threshold (Psbs) to a new power level P1. The new wavelength $\lambda 1'$ and the other wavelengths $\lambda 2'$ to $\lambda 5'$ that are produced are each lower in power than the original signal $\lambda 1$ shown in FIG. 5a. The total power of $\lambda 1'$ to $\lambda 5'$ is equal to the power of the original wavelength $\lambda 1$ before the frequency modulation was applied. The frequency modulation and the resulting distribution of the total optical power are accomplished by using a microwave RF signal to drive phase modulation port 295 of phase modulator 230. This keeps the power of the strongest optical wavelength $\lambda 1'$ below the SBS threshold level. In one embodiment, the microwave RF signal used to drive the phase modulation port has a microwave frequency in the 1–3 Ghz range.

In order to increase the total launch power while suppressing the effects of SBS, SBS oscillator/driver 218 frequency modulates the microwave RF signal that drives the phase port 295 of phase modulator 230 using a second oscillator. Instead of only one high frequency RF signal driving the optical phase port to create optical sidebands, there are many RF signals. The result is a distribution of energy amongst the many optical sidebands that are produced by the FM modulation, of FIG. 5b, as illustrated by FIG. 5c. When driving the phase port each of these RF components will generate their own distribution of other optical wavelengths (optical sidebands) on either side of the original wavelengths $\lambda 1''$ to $\lambda 5''$ (formerly $\lambda 1'$ to $\lambda 5'$) as shown in FIG. 5c. In operation, the SBS oscillator/driver 218 feeds the frequency modulated microwave RF signal into phase modulation port 295 of phase modulator 230 which in turn feeds a dual frequency modulated optical signal into an optical input port 215 of optical modulator 210 to allow for a high optical launch power by amplifier 212 without the effects of SBS. In one embodiment, amplifier 212 is an Erbium Doped Fiber amplifier (EDFA). Again, although only a limited number of optical side bands are shown in FIG. 5c, any number of optical sidebands may be produced.

Setting the FM drive to the correct power level results in SBS oscillator/driver 218 further reducing the power of the original wavelength to a level P2 and achieving a higher total launch power without the detrimental effects of SBS. As a result of the dual frequency modulation, the strongest optical wavelength is now at a level P2 away from the critical SBS launch power threshold (Psbs). This improves the amount of gain that can be achieved at the output and the total system launch power.

Further, transmitter 200 includes a laser 216 coupled to an optical input 281 of phase modulator 230. In one embodiment, transmitter 200 also includes a DC bias control device 214 coupled to optical modulator 210. The laser 216 operates in the cool white (CW) mode and provides the "light source" that has its phase modulated in the phase modulator 230. The phase modulated optical signal is then fed into an optical input 215 of optical modulator 210 where it has its intensity or amplitude modulated. The optical modulation is accomplished by feeding the radio frequency AM signal to the appropriate amplitude modulation port 211 of optical modulator 210. In this way, RF amplitude modulation is converted into optical amplitude modulation.

In one embodiment, transmitter 200 includes laser bias and temperature control circuitry 220 coupled to laser 216. In an alternate embodiment, laser bias and temperature control circuitry 220 are integral to laser 216.

In one embodiment, transmitter 200 includes a band limited noise generator 222 coupled to laser 216. In operation, band limited noise generator 222 is used to feed an amplitude modulation port 217 of laser 216 in order to generate signals at a plurality of wavelengths based on the frequency modulation (chirp) factor of the laser. By taking a signal such as $\lambda 1$ of FIG. 6a and putting some modulation on that particular signal by driving the laser 216 with noise the result is a reduction in the overall launch power (Psbs) of $\lambda 1$ by an amount Pn resulting in $\lambda 1'$. The power in the strongest wavelength $\lambda 1'$ still exceeds Psbs but by an amount less than without the addition of noise. The noise modulation of laser 216 produces many lower powered optical wavelengths, sidebands, as shown in FIG. 6b. The noise drops the main signal $\lambda 1$, reduces the amplitude, which provides additional margin with respect to Psbs. Combining the noise modulation with the frequency modulation of the optical signal and the frequency modulation of the high frequency microwave RF signal results in a plurality of optical signals at a level of P2+Pn or more away from Psbs. As a result, the drive capability of the system has now been increased over the dual frequency modulation system discussed above.

Figure 3:
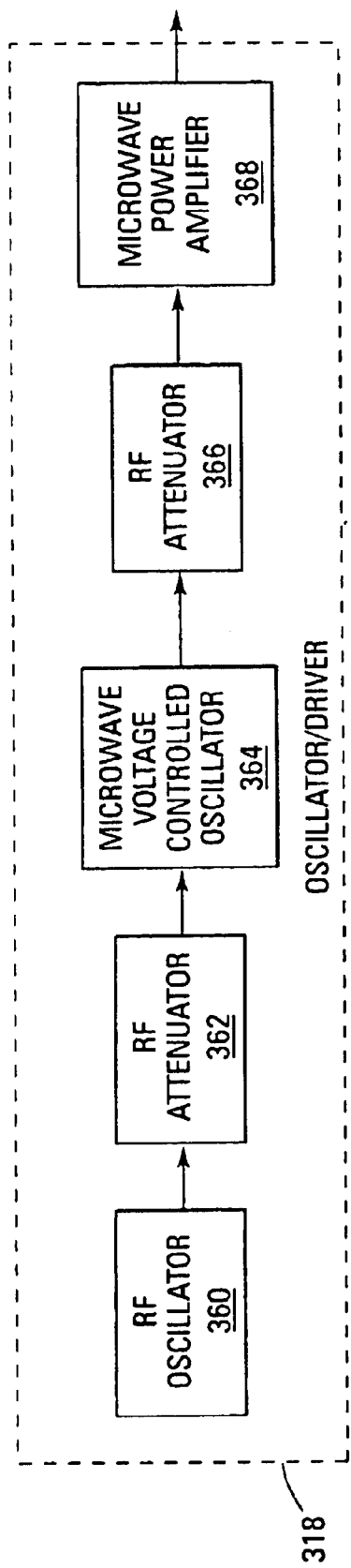
FIG. 3 is a block diagram of one embodiment of an oscillator/driver for a transmitter according to the teachings of the present invention.

FIG. 3 is a block diagram of one embodiment of an SBS oscillator/driver device, indicated generally at 318, and constructed according to the teachings of the present invention. The SBS oscillator/driver 318 includes an RF oscillator 360 coupled to a first RF attenuator 362, a microwave voltage controlled oscillator 364 coupled to the first RF attenuator 362 and a second RF attenuator 366. In addition, SBS oscillator/driver 318 includes a microwave power amplifier 368 coupled to the second RF attenuator 366. In operation, the SBS oscillator/driver 318 feeds a plurality of microwave RF signals into a phase modulation port of an optical modulator such as 110 or an optical phase modulator such as 230 of FIGS. 1 and 2, respectively.

The RF oscillator 360 and the first RF attenuator 362 are used to drive a frequency/phase modulation port of the microwave voltage controlled oscillator 364. In this way the microwave output frequency of this oscillator/driver 318 will contain many RF sidebands which drives a modulator to produce many optical sidebands, as shown in FIG. 5b. Combined with RF oscillator 360, the second RF attenuator 366 and microwave power amplifier 368 raise the signal level of the many RF sidebands to effectively drive the phase port of the modulator in order to facilitate the generation of many additional optical sidebands as shown in FIG. 5c. The result is the compounding of frequency modulation on top of frequency modulation.

In one embodiment, a transmitter such as 100 in FIG. 1 transmits optical output signals 121 and 123, that are AM modulated, between 50 and 870 MHz to an optical receiver. In this embodiment, oscillator/driver 318 includes a 1–20 MHz RF oscillator 360 and a 2.2 GHz microwave voltage controlled oscillator 364. In one embodiment, the oscillator/driver 318 then produces a 2.2 GHz frequency modulated microwave RF signal. The oscillator/driver 318 feeds the microwave RF signal to an optical modulator such as 110 in FIG. 1 or a phase modulator such as 230 in FIG. 2. Optical modulator 110 receives an AM modulation signal between 0 and 1 GHz and the microwave RF signal of 2.2 GHz and produces two optical amplitude modulated sideband signals between 50 and 870 MHz each. In one embodiment, the microwave RF signal is frequency modulated and therefore contains multiple RF sidebands that produce multiple optical sidebands in each of the two optical amplitude modulated signals. In order to minimize beat notes in the AM components of the optical signals, the microwave voltage controlled oscillator 364 is above the highest frequency component of the AM modulation signal by a ratio of 2:1. It is understood that in other embodiments the value of signals and components will vary according to the application and the above embodiment is not meant to be restrictive.

Figure 4:
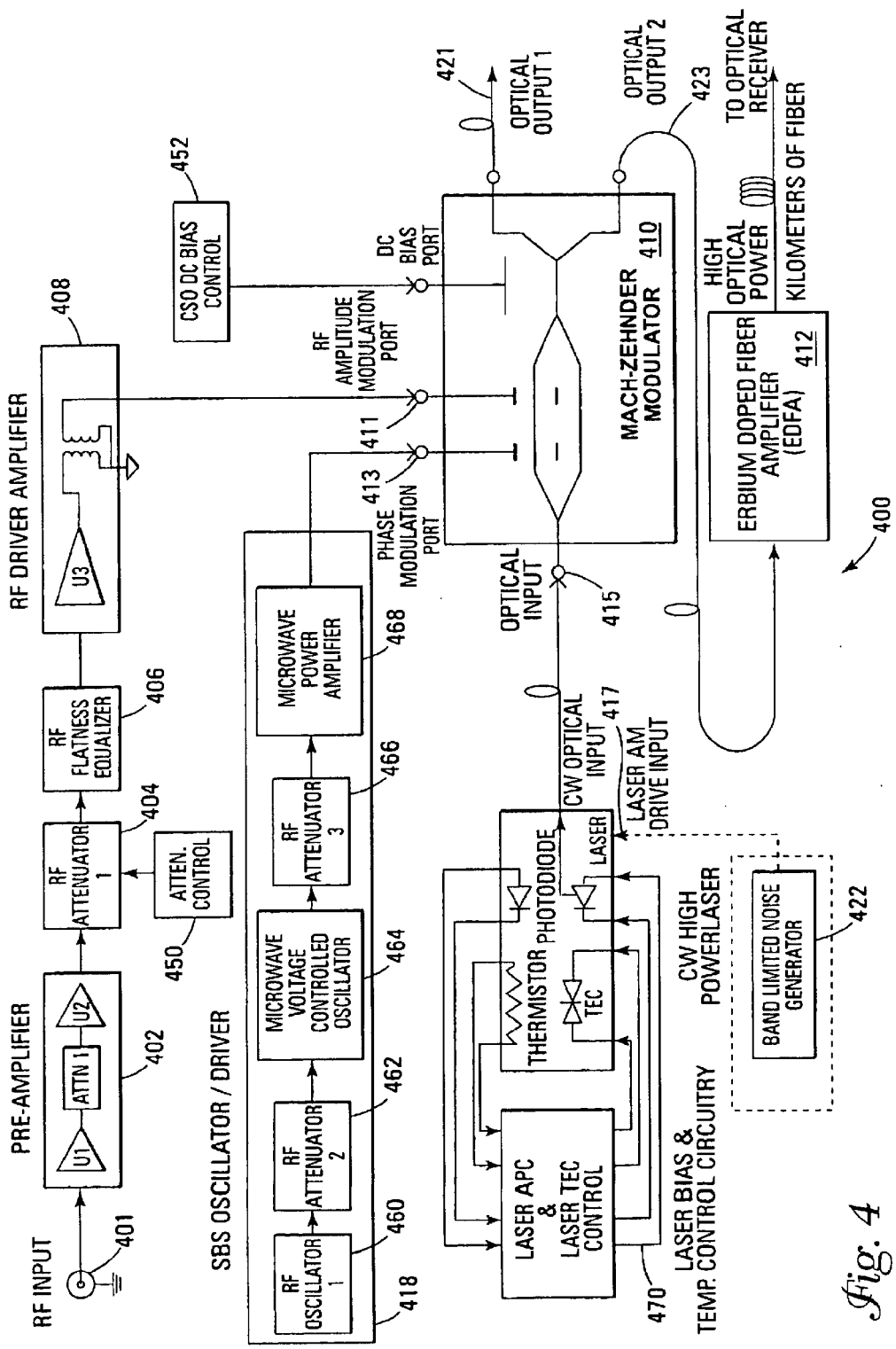
FIG. 4 is a block diagram of an alternate embodiment of a transmitter with stimulated Brillouin scattering suppression according to the teachings of the present invention.

FIG. 4 is a block diagram of one embodiment of a transmitter including an SBS oscillator driver 418, indicated generally at 400, and constructed according to the teachings of the present invention. Transmitter 400 receives a radio frequency (RF) input signal at input 401 and produces two optical outputs 421 and 423. In other embodiments, the transmitter may produce one or more optical outputs. The RF input signal is fed into a pre-amplifier 402 that receives the signal at input 401, amplifies it and feeds it to attenuator 404. Attenuator 404 receives the amplified signal, attenuates the signal and then feeds the attenuated signal to equalizer 406. In alternate embodiments, the attenuator 404 comprises a PIN attenuator, a variable attenuator or the like. In this embodiment, attenuator 404 is coupled to an output of an attenuator control device 450. Equalizer 406 receives the attenuated signal, equalizes it and feeds it to RF driver amplifier 408. Amplifier 408 receives the equalized signal, amplifies the signal and drives the amplified signal to an RF amplitude modulation port 411 of optical modulator 410 or other non-linear device capable of varying the signal.

In operation, the pre-amplifier 402 boosts the RF input signal to an adequate level in order to improve the transmitter input signal-to-noise ratio. The following attenuator 404, equalizer 406, and amplifier 408, shape the RF input signal to properly drive the modulator 410 under varying input signal conditions. The amplified signal is received by optical modulator 410 at input 411 and is used to amplitude modulate an optical input signal for transmission. In this embodiment, modulator 410 is a Mach-Zehnder optical modulator external to the transmitter. In another embodiment, modulator 410 is an optical modulator and may be internal or external to the transmitter. In alternate embodiments, the modulator may comprise any variety of internal or external non-linear devices such as an optical modulator, a directly modulated laser or the like.

Further, transmitter 400 includes a laser 470 coupled to optical modulator 410.

Transmitter 400 also includes a DC bias control device 414 coupled to optical modulator 410. The laser 416 operates in the cool white (CW) mode and provides the "light source" that has its intensity or amplitude modulated in the optical modulator 410. The optical modulation is accomplished by feeding the radio frequency AM signal to the appropriate amplitude modulation port 411 of optical modulator 410. In this way, RF amplitude modulation is converted into optical amplitude modulation. In addition, laser 416 includes laser bias and temperature control circuitry.

Transmitter 400 further includes an SBS oscillator/driver 418 coupled to optical modulator 41 0. SBS oscillator/driver 418 is coupled to a phase modulation port 413 of optical modulator 410. The SBS oscillator/driver 418 distributes the total optical power of the amplitude modulated optical signal of optical modulator 410 amongst many optical wavelengths by dual frequency modulation the signal. SBS oscillator/driver 418 includes two oscillators in order to perform the dual frequency modulation.

By way of example, FIG. 5a shows optical wavelength, $\lambda 1$, which exceeds the fiber SBS launch power threshold (Psbs) by an amount R. As a result the undesired wavelength, $\lambda n$, is generated. SBS oscillator/driver 418 reduces the power of $\lambda 1$ by distributing the wavelength over a plurality of wavelengths $\lambda 1'$ to $\lambda 5'$, as illustrated by FIG. 5b. A first oscillator 464 of the two oscillators of the SBS oscillator/driver 418 accomplishes this. In one embodiment, the first oscillator 464 is a microwave voltage controlled oscillator. It is understood that five wavelengths are shown by way of example and that the number of wavelengths $\lambda 1$ is distributed into may vary. The power of the original wavelength $\lambda 1$ has been lowered below the critical SBS launch power threshold (Psbs) to a new power level P1. The new wavelength $\lambda 1'$ and the other wavelengths $\lambda 2'$ to $\lambda 5'$ that are produced are each lower in power than the original signal $\lambda 1$ shown in FIG. 5a. The total power of $\lambda 1'$ to $\lambda 5'$ is equal to the power of the original wavelength $\lambda 1$ before the frequency modulation was applied. The frequency modulation and the resulting distribution of the total optical power are accomplished by using a microwave RF signal to drive phase modulation port 413. This keeps the power of the strongest optical wavelength $\lambda 1'$ below the SBS threshold level. In one embodiment, the microwave RF signal used to drive the phase modulation port has a microwave frequency in the 1–3 Ghz range.

In order to increase the total launch power while suppressing the effects of SBS, SBS oscillator/driver 418 frequency modulates the microwave RF signal that drives the phase port 413 of optical modulator 410 using a second oscillator 460. In one embodiment, the second oscillator 460 is coupled to an input of the first oscillator 464 via an RF attenuator 462. Instead of only one high frequency RF signal driving the optical phase port to create optical sidebands, there are many RF signals. The result is a distribution of energy amongst the many optical sidebands that are produced by the FM modulation, of FIG. 5b, as illustrated by FIG. 5c. When driving the phase port each of these RF components will generate their own distribution of other optical wavelengths (optical sidebands) on either side of the original wavelengths λ1" to λ5" (formerly λ1' to λ5') as shown in FIG. 5c. In operation, the SBS oscillator/driver 418 feeds the frequency modulated signal into a phase modulation port 413 of optical modulator 410, which results in frequency modulation of the optical signal, or dual frequency modulation, to allow for a high optical launch power by amplifier 412 without the effects of SBS. In one embodiment, amplifier 412 is an Erbium Doped Fiber amplifier (EDFA). Again, although only a limited number of optical side bands are shown in FIG. 5c any number of optical sidebands may be produced.

Setting the FM drive level to the correct power level results in SBS oscillator/driver 418 further reducing the power of the original wavelength to a level P2 and a higher total launch power can be achieved without the detrimental effects of SBS. As a result of the dual frequency modulation, the strongest optical wavelength is now at a level P2 away from the critical SBS launch power threshold (Psbs). This improves the amount of gain that can be achieved at the output and the total system launch power.

In one embodiment, transmitter 400 includes a band limited noise generator 422 coupled to laser 416. In operation, band limited noise generator 422 is used to feed an amplitude modulation port 417 of the laser 416 in order to generate signals at a plurality of wavelengths based on the frequency modulation (chirp) factor of the laser. By taking a signal such as λ1 of FIG. 6a and putting some modulation on that particular signal by driving laser 416 with noise the result is a reduction in the overall launch power (Psbs) of λ1 by an amount Pn. The power in the strongest wavelength λ1' still exceeds Psbs but by an amount less than without the addition of noise. The noise modulation of laser 416 produces many lower powered optical wavelengths, sidebands, as shown in FIG. 6b. The noise drops the main signal λ1, reduces the amplitude, which provides additional margin with respect to Psbs. Combining the noise modulation with the frequency modulation of the optical signal and the frequency modulation of the high frequency microwave RF signal results in a plurality of optical signals at a level of P2+Pn or more away from Psbs. As a result, the drive capability of the system has now been increased over the dual frequency modulation system discussed above.

Figure 7:
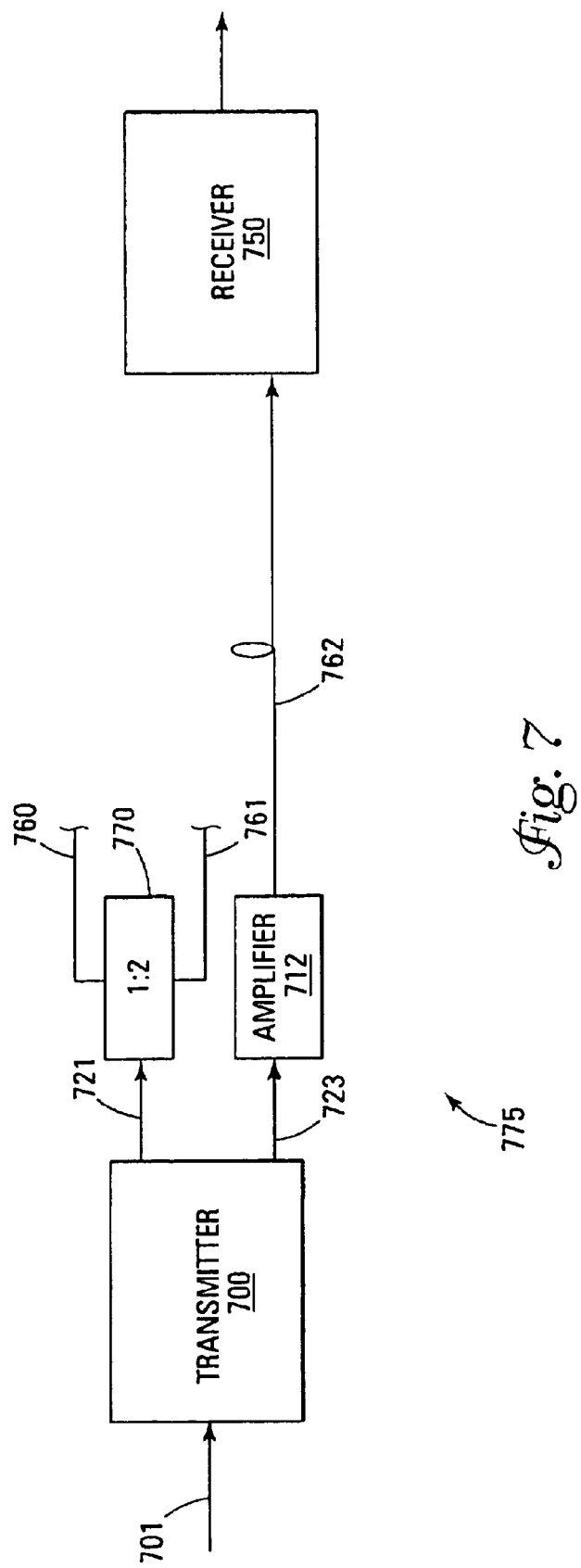
FIG. 7 is a block diagram of one embodiment of a communication system having a transmitter with stimulated Brillouin scattering suppression according to the teachings of the present invention.

FIG. 7 is a block diagram of an embodiment of a communication system 775 having a transmitter 700 with an SBS oscillator/driver according to the teachings of the present invention. In this embodiment, the SBS oscillator/driver accomplishes SBS suppression via dual frequency modulation as described above. In an alternate embodiment, transmitter 700 includes a band limited noise generator that performs noise modulation and further suppresses the effects of SBS as discussed above. In this embodiment, transmitter 700 is a 1550 nm wavelength external modulation transmitter and in other embodiments the transmitter may be an optical transmitter, a Mach-Zehnder transmitter, a phase modulator coupled to an optical modulator or the like of any of a variety of wavelengths.

One application of communication system 775 is the transport of cable television (CATV) channels between two distant locations via an optical link. In one embodiment, communication system 775 transports 80–112 CATV channels.

Transmitter 700 receives RF signals at input 701 and performs optical modulation using RF modulation techniques. The input signal may consist of 80–112 CATV multi-cast radio frequency channel insertion or any multitude of input signals for transmission by communication system 775. Transmitter 700 provides two optical output signals 721 and 723. Output signal 721 is fed into an optical splitter 770 and split into two signals for transport by transmission lines 760 and 761 to corresponding receivers (not shown). Splitting output signal 721 via optical splitter results in two optical signals that are reduced in amplitude by one half. Depending upon the original amplitude of signal 721 and the length of fiber between splitter 770 and a corresponding receiver, the need for an amplifier and the need for SBS suppression is reduced or not required for output signal 721. In an alternate embodiment, splitter 770 is replaced with a second amplifier.

Output signal 723 is fed into an amplifier 712. In one embodiment, amplifier 712 is an EDFA amplifier. Amplifier 712 amplifies output signal 723 and launches the amplified signal via transmission line 762 for receipt by receiver 750. Receiver 750 receives the launched signal and converts the optical signal back into the original RF CATV format that was originally input to the transmitter at 701.

In this embodiment, transmitter 700 and receiver 750 are 1550 nm wavelength components. In other embodiments, transmitter 700 and receiver 750 may comprise appropriate wavelength components for each application.

Figure 8:
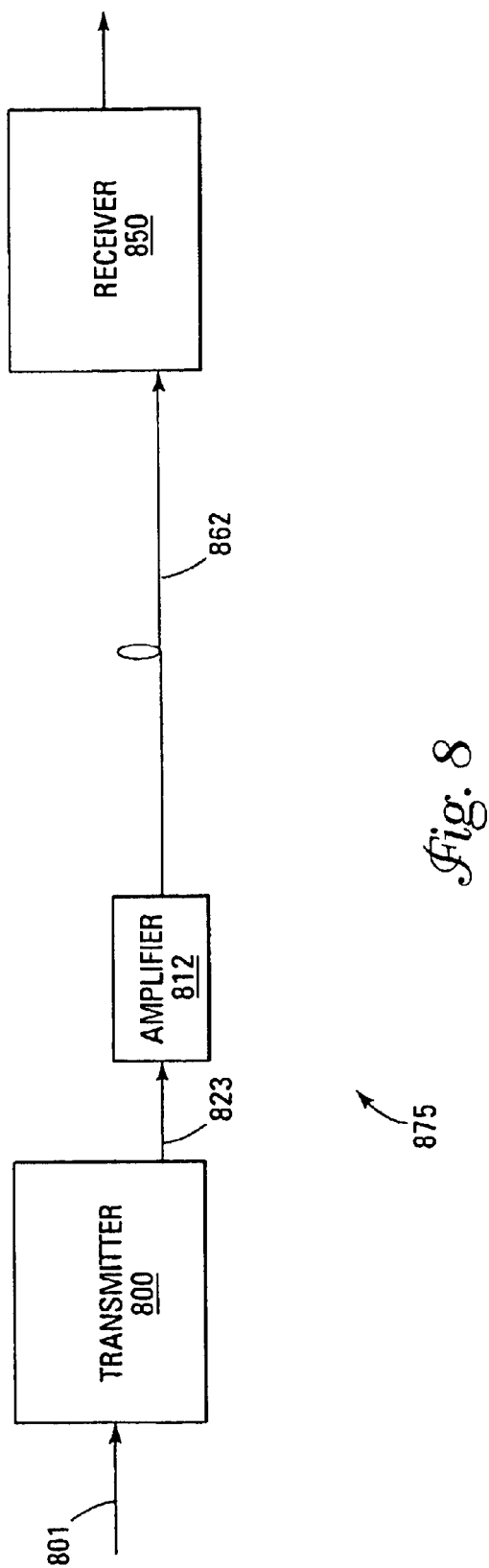
FIG. 8 is a block diagram of another embodiment of a communication system having a transmitter with stimulated Brillouin scattering suppression according to the teachings of the present invention.

FIG. 8 is a block diagram of another embodiment of a communication system 875 having a transmitter 800 with an SBS oscillator/driver according to the teachings of the present invention. In this embodiment, the SBS oscillator/driver accomplishes SBS suppression via dual frequency modulation as described above. In an alternate embodiment, transmitter 800 includes a band limited noise generator that performs noise modulation and further suppresses the effects of SBS as discussed above. In this embodiment, transmitter 800 is a 1550 nm wavelength external modulation transmitter and in other embodiments the transmitter may be an optical transmitter, a Mach-Zehnder transmitter, a phase modulator coupled to an optical modulator or the like of any of a variety of wavelengths.

One application of communication system 875 is the transport of cable television (CATV) channels between two distant locations via an optical link. In one embodiment, communication system 875 transports 80–112 CATV channels.

Transmitter 800 receives RF signals at input 801 and performs optical modulation using RF modulation techniques. The input signals may consist of 80–112 CATV multi-cast radio frequency channel insertion or any multitude of input signals for transmission by communication system 875. Transmitter 800 provides one optical output signal 823.

Output signal 823 is fed into an amplifier 812. In one embodiment, amplifier 812 is an EDFA amplifier. Amplifier 812 amplifies output signal 823 and launches the amplified signal via transmission line 862 for receipt by receiver 850. Receiver 850 receives the launched signal and converts the optical signal back into the original RF CATV format that was originally input to the transmitter at 801.

In this embodiment, transmitter 800 and receiver 850 are 1550 nm wavelength components. In other embodiments, transmitter 800 and receiver 850 may comprise appropriate wavelength components for each application.

In alternate embodiments, transmitter 800 produces one or more output signals and each output signal is coupled to an amplifier. In further embodiments, transmitter 800 produces one or more output signals and at least one of the one or more output signals is coupled to an amplifier and at least one of the one or more output signals is coupled to a splitter.

Conclusion

A transmitter has been described. The transmitter includes a non-linear device having an optical input adapted to receive an optical signal, an amplitude modulation input adapted to receive an amplitude modulation signal, a phase modulation input, and an output. The transmitter also includes a stimulated Brillouin scattering (SBS) oscillator/driver having first and second oscillators coupled to the phase modulation input of the non-linear device and an amplifier coupled to the output of the non-linear device. The transmitter further includes a laser coupled to the optical input of the non-linear device.

Another embodiment of a transmitter has been described. The transmitter includes an optical modulator that includes an input adapted to receive a radio frequency signal, an optical signal input, and an output. The transmitter also includes a phase modulator having an optical input, a phase modulation input and an output. The output of the phase modulator is coupled to the optical input of the optical modulator. The transmitter further includes an SBS oscillator/driver coupled to the phase modulation input of the phase modulator, an amplifier coupled to the output of the optical modulator and a laser coupled to the optical input of the phase modulator.

An embodiment of a communication system has been described. The communication system includes a transmitter having a non-linear device with an optical input, an amplitude modulation input, a phase modulation input and an output. The transmitter also includes a stimulated Brillouin scattering (SBS) oscillator/driver having first and second oscillators coupled to the phase modulation input of the non-linear device. The communication system also includes at least one receiver and at least one transmission line coupled between the transmitter and the at least one receiver.

A method of suppressing stimulated Brillouin scattering in an optical transmission has been described. The method includes receiving a radio frequency input signal, amplitude modulating the radio frequency signal and feeding the amplitude modulated radio frequency signal to an amplitude modulation input of a non-linear device. The method also includes generating an optical signal using a laser and feeding the optical signal to an optical input of the non-linear device. The method further includes frequency modulating the optical signal using a microwave radio frequency signal generated by a first oscillator, frequency modulating the microwave radio frequency signal using a second oscillator which is coupled to an input of the first oscillator and feeding the frequency modulated microwave radio frequency signal to a phase modulation port of the non-linear device.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A transmitter, comprising:
   a non-linear device that includes:
     an optical input adapted to receive an optical signal;
     an amplitude modulation input adapted to receive an amplitude modulation signal;
     a phase modulation input;
     wherein the optical signal is amplitude modulated by the amplitude modulation signal; and
     an output;
   a stimulated Brillouin scattering (SBS) oscillator/driver having first and second oscillators coupled to the phase modulation input of the non-linear device;
   wherein the SBS oscillator/driver produces a plurality of RF signals by frequency modulating a microwave RF signal;
   wherein the total optical power of the amplitude modulated optical signal is distributed amongst many optical wavelengths by driving the phase modulation input with the plurality of RF signals;
   wherein each of the plurality of RF signals generates their own distribution of optical sidebands;
   an amplifier coupled to the output of the non-linear device; and
   a laser coupled to the optical input of the non-linear device.

2. The transmitter of claim 1, wherein the non-linear device comprises an optical modulator.

3. The transmitter of claim 2, wherein the optical modulator comprises a Mach-Zehnder optical modulator.

4. The transmitter of claim 1, wherein the non-linear device comprises a phase-modulator coupled to an optical modulator.

5. The transmitter of claim 1, further comprising laser bias and temperature control circuitry coupled to the laser.

6. The transmitter of claim 1, wherein the laser comprises laser bias and temperature control circuitry.

7. The transmitter of claim 1, wherein the amplifier comprises an erbium doped fiber amplifier.

8. The transmitter of claim 1, further comprising a noise generator coupled to an input of the laser.

9. A transmitter comprising:
   a non-linear device that includes:
     an optical input adapted to receive an optical signal;
     an amplitude modulation input adapted to receive an amplitude modulation signal;
     a phase modulation input; and
     an output;
   a stimulated Brillouin scattering (SBS) oscillator/driver having first and second oscillators coupled to the phase modulation input of the non-linear device;
   an amplifier coupled to the output of the non-linear device; and
   a laser coupled to the optical input of the non-linear device;
   wherein the SBS oscillator/driver comprises:
     a radio frequency (RF) oscillator;
     a first RF attenuator coupled to the RF oscillator;
     a microwave oscillator coupled to the first RF attenuator;
     a second RF attenuator coupled to the microwave oscillator; and
     a microwave power amplifier coupled to the second RF attenuator.

10. The transmitter of claim 9, wherein the frequency of the microwave oscillator exceeds the highest frequency of the amplitude modulation signal by a factor of 2.

11. A transmitter, comprising:
an amplification circuit;
a non-linear device coupled to an output of the amplification circuit;
an SBS oscillator/driver, having first and second oscillators, coupled to an input of the non-linear device;
wherein the SBS oscillator/driver produces a plurality of RF signals by frequency modulating a microwave RF signal;
an amplifier coupled to an output of the non-linear device; and
a laser coupled to an optical input of the non-linear device.
wherein the laser produces an optical signal that is amplitude modulated by the output of the amplification circuit;
wherein the total optical power of the amplitude modulated optical signal is distributed amongst many optical wavelengths by driving a phase modulation port of the non-linear device with the plurality of RF signals;
wherein each of the plurality of RF signals generates their own distribution of optical sidebands.

12. The transmitter of claim 11, wherein the non-linear device comprises an optical modulator.

13. The transmitter of claim 12, wherein the optical modulator comprises a Mach-Zehnder optical modulator.

14. The transmitter of claim 11, wherein the non-linear device comprises a phase-modulator coupled to an input of an optical modulator.

15. The transmitter of claim 14, wherein the optical modulator comprises Mach-Zehnder optical modulator.

16. The transmitter of claim 11, further comprising a laser bias and temperature control circuitry coupled to the laser.

17. The transmitter of claim 11, wherein the laser comprises laser bias and temperature control circuitry.

18. The transmitter of claim 11, wherein the amplifier comprises an erbium doped fiber amplifier.

19. The transmitter of claim 11, further comprising a noise generator coupled to an input of the laser.

20. The transmitter of claim 11, wherein the input to the non-linear device comprises a phase modulation port.

21. A transmitter comprising:
an amplification circuit;
a non-linear device coupled to an output of the amplification circuit;
an SBS oscillator/driver, having first and second oscillators, coupled to an input of the non-linear device;
an amplifier coupled to an output of the non-linear device; and
a laser coupled to an optical input of the non-linear device;
wherein the amplification circuit comprises:
 a pre-amplifier circuit;
 an attenuator coupled to an output of the pre-amplifier;
 an equalizer coupled to the attenuator; and
 a radio frequency driver amplifier coupled to an output of the equalizer.

22. A transmitter comprising:
an amplification circuit;
a non-linear device coupled to an output of the amplification circuit;
an SBS oscillator/driver, having first and second oscillators, coupled to an input of the non-linear device;
an amplifier coupled to an output of the non-linear device; and
a laser coupled to an optical input of the non-linear device;
wherein the SBS oscillator/driver comprises:
 a radio frequency (RF) oscillator;
 a first RF attenuator coupled to the RF oscillator;
 a microwave oscillator coupled to the first RF attenuator;
 a second RF attenuator coupled to the microwave oscillator; and
 a microwave power amplifier coupled to the second RF attenuator.

23. The transmitter of claim 22, wherein the frequency of the microwave oscillator exceeds the highest frequency of the output of the radio frequency driver amplifier by a factor of 2.

24. A transmitter, comprising:
a pre-amplifier circuit coupled in series with an attenuator and an equalizer;
a driver amplifier circuit coupled to the equalizer;
a non-linear device coupled to the driver amplifier circuit;
an SBS oscillator/driver coupled to the non-linear device, wherein the SBS oscillator/driver comprises at least two oscillators coupled in series;
an amplifier coupled to an output of the non-linear device; and
a laser coupled to the non-linear device, wherein the laser is coupled to a band limiting noise device and receives band-limiting noise.

25. The transmitter of claim 24, wherein the non-linear device comprises an optical modulator.

26. The transmitter of claim 25, wherein the optical modulator comprises a Mach-Zehnder optical modulator.

27. The transmitter of claim 24, wherein the non-linear device comprises a phase modulator and an optical modulator coupled in series.

28. The transmitter of claim 27, wherein the optical modulator comprises a Mach-Zehnder optical modulator.

29. The transmitter of claim 24, further comprising a laser bias and temperature control circuitry coupled to the laser.

30. The transmitter of claim 24, wherein the SBS oscillator/driver comprises:
 a radio frequency (RF) oscillator;
 a first RF attenuator coupled to the RF oscillator;
 a microwave oscillator coupled to the first RF attenuator;
 a second RF attenuator coupled to the microwave oscillator; and
 a microwave power amplifier coupled to the second RF attenuator.

31. The transmitter of claim 30, wherein the frequency of the microwave oscillator exceeds above the highest frequency an output signal of the driver amplifier a factor of 2.

32. The transmitter of claim 30, wherein the laser comprises laser bias and temperature control circuitry.

33. The transmitter of claim 24, wherein the amplifier comprises an erbium doped fiber amplifier.

34. A transmitter, comprising:
an optical modulator that includes an input adapted to receive a radio frequency signal, an optical signal, and an output;
a phase modulator having an optical input, a phase modulation input and an output, the output coupled to the optical input of the optical modulator;
an SBS oscillator/driver including first and second oscillators coupled to the phase modulation input of the phase modulator;

wherein the SBS oscillator/driver produces a plurality of RF signals by frequency modulating a microwave RF signal;

an amplifier coupled to the output of the optical modulator; and a laser coupled to the optical input of the phase modulator;

wherein the laser produces an optical signal that is amplitude modulated by an amplitude modulated RF signal;

wherein the total optical power of the amplitude modulated optical signal is distributed amongst many optical wavelengths by driving the phase modulation input of the phase modulator with the plurality of RF signals;

wherein each of the plurality of RF signals generates their own distribution of optical sidebands.

35. The transmitter of claim 34, wherein the optical modulator comprises a Mach-Zehnder optical modulator.

36. The transmitter of claim 35, further comprising a laser bias and temperature control circuitry coupled to the laser.

37. The transmitter of claim 34, wherein the laser comprises laser bias and temperature control circuitry.

38. The transmitter of claim 34, wherein the amplifier comprises an erbium doped fiber amplifier.

39. A transmitter, comprising:

an optical modulator that includes an input adapted to receive a radio frequency signal, an optical signal, and an output;

a phase modulator having an optical input, a phase modulation input and an output, the output coupled to the optical input of the optical modulator;

an SBS oscillator/driver coupled to the phase modulation input of the phase modulator;

an amplifier coupled to the output of the optical modulator; and a laser coupled to the optical input of the phase modulator;

wherein the optical modulator comprises a Mach-Zehnder optical modulator;

wherein the SBS oscillator/driver comprises:
a radio frequency (RF) oscillator;
a first RF attenuator coupled to the RF oscillator;
a microwave oscillator coupled to the first RF attenuator;
a second RF attenuator coupled to the microwave oscillator; and
a microwave power amplifier coupled to the second RF attenuator.

40. A transmitter, comprising:

a pre-amplifier circuit;

an attenuator coupled to the pre-amplifier;

an equalizer coupled to the attenuator;

a driver amplifier circuit coupled to the equalizer;

an optical modulator which includes a radio frequency input, an optical signal input, and an output, the radio frequency input coupled to an output of the driver amplifier circuit;

a phase modulator having an optical input, a phase modulation input and an output, the output coupled to the optical input of the optical modulator;

an SBS oscillator/driver coupled to the phase modulation input of the phase modulator;

an amplifier coupled to an output of the optical modulator; and a laser coupled to the optical input of the phase modulator.

41. The transmitter of claim 40, wherein the optical modulator comprises a Mach-Zehnder optical modulator.

42. The transmitter of claim 40, further comprising a laser bias and temperature control circuitry coupled to the laser.

43. The transmitter of claim 40, wherein the SBS oscillator/driver comprises:
a radio frequency (RF) oscillator;
a first RF attenuator coupled to the RF oscillator;
a microwave oscillator coupled to the first RF attenuator;
a second RF attenuator coupled to the microwave oscillator; and
a microwave power amplifier coupled to the second RF attenuator.

44. The transmitter of claim 40, wherein the laser comprises laser bias and temperature control circuitry.

45. The transmitter of claim 40, wherein the amplifier comprises an erbium doped fiber amplifier.

46. A transmitter, comprising:

a pre-amplifier circuit;

an attenuator coupled to the pre-amplifier;

an equalizer coupled to the attenuator;

a driver amplifier circuit coupled to the equalizer;

an optical modulator which includes a radio frequency input, an optical signal input, and an output, the radio frequency input coupled to an output of the driver amplifier circuit;

a phase modulator having an optical input, a phase modulation input and an output, the output coupled to the optical input of the optical modulator;

an SBS oscillator/driver coupled to the phase modulation input of the phase modulator;

an amplifier coupled to an output of the optical modulator; and a laser coupled to the optical input of the phase modulator and wherein the laser is coupled to a band limiting noise device and receives band-limiting noise.

47. The transmitter of claim 46, wherein the optical modulator comprises a Mach-Zehnder optical modulator.

48. The transmitter of claim 46, further comprising a laser bias and temperature control circuitry coupled to the laser.

49. The transmitter of claim 46, wherein the SBS oscillator/driver comprises:
a radio frequency (RF) oscillator;
a first RF attenuator coupled to the RF oscillator;
a microwave oscillator coupled to the first RF attenuator;
a second RF attenuator coupled to the microwave oscillator; and
a microwave power amplifier coupled to the second RF attenuator.

50. The transmitter of claim 46, wherein the laser comprises laser bias and temperature control circuitry.

51. The transmitter of claim 46, wherein the amplifier comprises an erbium doped fiber amplifier.

52. A method of suppressing stimulated Brillouin scattering in an optical transmission, the method comprising:

receiving a radio frequency input signal;

amplitude modulating the radio frequency signal;

feeding the amplitude modulated radio frequency signal to an amplitude modulation input of a non-linear device;

generating an optical signal using a laser;

feeding the optical signal to an optical input of the non-linear device;

frequency modulating the optical signal using a microwave radio frequency signal generated by a first oscillator;

producing a plurality of RF signals by frequency modulating the microwave radio frequency signal using a second oscillator which is coupled to an input of the first oscillator; and generating a distribution of optical sidebands for each of the plurality of RF signals by feeding the plurality of frequency modulated microwave radio frequency signals to a phase modulation port of the non-linear device.

53. The method of claim 52, wherein feeding an amplitude modulated RF signal to an amplitude modulation input of a non-linear device comprises feeding an amplitude modulated RF signal to an amplitude modulation input of an optical modulator.

54. The method of claim 52, further comprising modulating the optical signal by applying a noise modulation signal to an input of the laser.

55. The method of claim 52, further comprising amplifying an optical output signal of the non-linear device with an erbium doped fiber amplifier.

56. The method of claim 52, wherein feeding the frequency modulated microwave radio frequency signal to a phase modulation port of the non-linear device comprises feeding the frequency modulated microwave radio frequency signal to a phase modulation port of a phase modulator coupled in series with an optical modulator.

57. A method of suppressing stimulated Brillouin scattering in an optical transmission, the method comprising:

generating an optical signal using a laser;

feeding the optical signal to an optical input of a non-linear device;

frequency modulating the optical signal using a microwave radio frequency signal generated by a first oscillator;

producing a plurality of RF signals by frequency modulating the microwave radio frequency signal using a second oscillator which is coupled to an input of the first oscillator; and feeding the plurality of frequency modulated microwave radio frequency signals to a phase modulation port of the non-linear device;

wherein feeding the plurality of frequency modulated microwave radio frequency signals to a phase modulation port of the non-linear device generates a distribution of optical sidebands for each of the plurality of RF signals.

58. The method of claim 57, further comprising modulating the optical signal by applying a noise modulation signal to an input of the laser.

59. The method of claim 57, further comprising amplifying an optical output signal of the non-linear device with an erbium doped fiber amplifier.

60. The method of claim 57, wherein feeding the frequency modulated microwave radio frequency signal to a phase modulation port of the non-linear device comprises feeding the frequency modulated microwave radio frequency signal to a phase modulation port of a phase modulator coupled in series with an optical modulator.

61. A communication system comprising:

a transmitter that includes:

a non-linear device having an optical input, an amplitude modulation input, a phase modulation input and an output;

wherein an optical input signal received at the optical input is amplitude modulated by an amplitude modulated RF signal received at the amplitude modulated input; and a stimulated Brillouin scattering (SBS) oscillator/driver having first and second oscillators coupled to the phase modulation input of the non-linear device;

wherein the SBS oscillator/driver produces a plurality of RF signals by frequency modulating a microwave RF signal;

at least one receiver; and at least one transmission line coupled between the transmitter and the at least one receiver;

wherein the total optical power of the amplitude modulated optical signal is distributed amongst many optical wavelengths by driving the phase modulation input with the plurality of RF signals;

wherein each of the plurality of RF signals generates their own distribution of optical sidebands.

62. The system of claim 61, wherein the at least one transmission line comprises an optical link.

63. The system of claim 61, wherein the transmitter includes at least one optical output.

64. The system of claim 63, further comprising an amplifier coupled to the at least one optical output.

65. The system of claim 64, wherein the amplifier comprises an erbium doped fiber amplifier.

66. The system of claim 61, wherein the transmitter further comprises a laser coupled to the optical input of the non-linear device.

67. The system of claim 66, wherein the laser comprises laser bias and temperature control circuitry.

68. The system of claim 66, further comprising a noise generator coupled to an input of the laser.

69. The system of claim 61, wherein the transmitter includes two optical output signals.

70. The system of claim 69, wherein the first optical output signal is coupled to an erbium doped fiber amplifier and the second optical output signal is coupled to a splitter, wherein the second optical output signal is split into at least two signal paths.

71. A communication system comprising:

a transmitter that includes:

a non-linear device having an optical input, an amplitude modulation input, a phase modulation input and an output; and a stimulated Brillouin scattering (SBS) oscillator/driver having first and second oscillators coupled to the phase modulation input of the non-linear device;

at least one receiver; and at least one transmission line coupled between the transmitter and the at least one receiver;

wherein the SBS oscillator/driver comprises:

a radio frequency (RF) oscillator;

a first RF attenuator coupled to the RF oscillator;

a microwave oscillator coupled to the first RF attenuator;

a second RF attenuator coupled to the microwave oscillator; and a microwave power amplifier coupled to the second RF attenuator.

72. The system of claim 71, wherein the frequency of the microwave oscillator exceeds the highest frequency of the amplitude modulation signal by a factor of 2.

73. The system of claim 71, wherein the non-linear device comprises an optical modulator.

74. The system of claim 73, wherein the optical modulator comprises a Mach-Zehnder optical modulator.

75. The system of claim 73, wherein the non-linear device comprises a phase modulator coupled to an input of an optical modulator.

76. A method of suppressing stimulated Brillouin scattering in an optical transmission, the method comprising:

generating an optical signal using a laser;

feeding the optical signal to an optical input of a non-linear device;

frequency modulating the optical signal using a microwave radio frequency signal generated by a first oscillator;

frequency modulating the microwave radio frequency signal using a second oscillator which is coupled to an input of the first oscillator;

feeding the frequency modulated microwave radio frequency signal to a phase modulation port of the non-linear device;

amplifying a first optical output signal of the non-linear device for transmission over an optical fiber using an erbium doped fiber amplifier; and splitting a second optical output signal of the non-linear device for transmission over two optical fibers.

77. The method of claim 76, further comprising modulating the optical signal by applying a noise modulation signal to an input of the laser.

78. The method of claim 76, wherein feeding the frequency modulated microwave radio frequency signal to a phase modulation port of the non-linear device comprises feeding the frequency modulated microwave radio frequency signal to a phase modulation port of a phase modulator coupled in series with an optical modulator.

79. A method of suppressing stimulated Brillouin scattering, the method comprising:

amplifying a radio frequency input signal;

transmitting the amplified radio frequency signal to an amplitude modulation port of an optical modulator;

generating an optical signal using a laser;

feeding the optical signal to an optical port of the optical modulator;

amplitude modulating the optical signal using the amplified radio frequency signal;

generating a frequency modulated microwave frequency signal using a first and a second radio frequency oscillator;

distributing the total optical power of the amplitude modulated optical signal amongst many optical wavelengths by dual frequency modulating the optical signal using the frequency modulated microwave frequency signal; and launching the dual frequency modulated optical signal over an optical fiber.

80. The method of claim 79, further comprising modulating the optical signal by applying a noise modulation signal to an input of the laser.

* * * * *

UNITED STATES PATENT AND TRADEMARK OFFICE
CERTIFICATE OF CORRECTION

PATENT NO.     : 6,813,448 B1                                          Page 1 of 1
DATED          : November 2, 2004
INVENTOR(S)    : Chiappetta It is certified that error appears in the above-identified patent and that said Letters Patent is hereby corrected as shown below:

Title page,
Item [56], References Cited, U.S. PATENT DOCUMENTS, please remove the second listing of Pat. No. "4,560,246    6/1998        Cotter".

Signed and Sealed this

Ninth Day of August, 2005

JON W. DUDAS
*Director of the United States Patent and Trademark Office*